United States Patent
Cox et al.

(10) Patent No.: US 9,461,470 B2
(45) Date of Patent: Oct. 4, 2016

(54) DISTRIBUTED ELECTRICITY DEMAND-RESERVE PREDICTION

(75) Inventors: Robert J. Cox, Maple Grove, MN (US); Corey G. Plender, St. Louis Park, MN (US); Andrew J. Sowada, St. Paul, MN (US); Roger W. Rognli, Otsego, MN (US)

(73) Assignee: Cooper Technologies Company, Houston, TX (US)

( * ) Notice: Subject to any disclaimer, the term of this patent is extended or adjusted under 35 U.S.C. 154(b) by 487 days.

(21) Appl. No.: 13/443,586

(22) Filed: Apr. 10, 2012

(65) Prior Publication Data

US 2013/0268136 A1 Oct. 10, 2013

(51) Int. Cl.
*H02J 3/14* (2006.01)
*H02J 3/00* (2006.01)

(52) U.S. Cl.
CPC ............ *H02J 3/14* (2013.01); *H02J 2003/003* (2013.01); *Y02B 70/3225* (2013.01); *Y04S 10/54* (2013.01); *Y04S 20/222* (2013.01)

(58) Field of Classification Search
CPC .... G05B 19/02; H02J 3/14; H02J 2003/003; Y02B 70/3225; Y04S 10/54; Y04S 20/222
USPC ....................................................... 700/295
See application file for complete search history.

(56) References Cited

U.S. PATENT DOCUMENTS

| | | |
|---|---|---|
| 4,241,237 A | 12/1980 | Paraskevakos et al. |
| 4,455,453 A | 6/1984 | Parasekvakos et al. |
| 4,620,283 A | 10/1986 | Butt et al. |
| 5,218,552 A | 6/1993 | Stirk et al. |
| 5,426,620 A | 6/1995 | Budney |
| 5,475,609 A | 12/1995 | Apothaker |
| 6,021,401 A | 2/2000 | Oravetz et al. |
| 6,671,586 B2 | 12/2003 | Davis et al. |
| 7,218,998 B1 | 5/2007 | Neale |
| 7,242,114 B1 | 7/2007 | Cannon et al. |
| 7,355,301 B2 | 4/2008 | Ockert et al. |
| 7,528,503 B2 * | 5/2009 | Rognli et al. ................... 307/62 |
| 7,595,567 B1 | 9/2009 | Cannon et al. |
| 7,702,424 B2 | 4/2010 | Cannon et al. |
| 7,715,951 B2 | 5/2010 | Forbes, Jr. et al. |
| 7,869,904 B2 | 1/2011 | Cannon et al. |
| 7,940,901 B2 | 5/2011 | Paraskevokos et al. |
| 8,010,812 B2 | 8/2011 | Forbes, Jr. et al. |
| 8,032,233 B2 | 10/2011 | Forbes, Jr. et al. |

(Continued)

FOREIGN PATENT DOCUMENTS

CA 1155243 10/1983

OTHER PUBLICATIONS

PCT Application No. PCT/US2013/033223, filed Mar. 21, 2013, Written Opinion and Search Report dated Jul. 25, 2013, 11 pages.

(Continued)

*Primary Examiner* — Robert Fennema
*Assistant Examiner* — Jigneshkumar Patel
(74) *Attorney, Agent, or Firm* — Patterson Thuente Pedersen P.A.

(57) ABSTRACT

A load control receiver (LCS) for controlling an electrical load. The LCS includes a power sensing arrangement that monitors power usage of the load; a processor that predicts future power usage based on prior power usage; a transceiver that receives load shedding commands; and a controllable switch that can interrupt power supplied to the attached loads, based on load shedding commands.

38 Claims, 8 Drawing Sheets

(56) References Cited

U.S. PATENT DOCUMENTS

| | | |
|---|---|---|
| 2005/0192713 A1 | 9/2005 | Weik et al. |
| 2009/0088991 A1* | 4/2009 | Brzezowski et al. ............ 702/62 |
| 2009/0102294 A1* | 4/2009 | Hodges et al. ............... 307/126 |
| 2010/0207448 A1 | 8/2010 | Cooper et al. |
| 2010/0222935 A1* | 9/2010 | Forbes et al. ................. 700/291 |
| 2011/0032070 A1 | 2/2011 | Bleile |
| 2011/0121654 A1* | 5/2011 | Recker et al. ................... 307/66 |
| 2011/0133655 A1* | 6/2011 | Recker et al. ................. 315/159 |
| 2011/0172837 A1* | 7/2011 | Forbes, Jr. ..................... 700/291 |
| 2011/0258022 A1 | 10/2011 | Forbes, Jr. et al. |
| 2012/0029717 A1 | 2/2012 | Cox et al. |
| 2012/0083939 A1 | 4/2012 | Rognli |
| 2012/0086273 A1 | 4/2012 | Rognli |

OTHER PUBLICATIONS

Renew Grid, EPRI, USNAP Working Collaboratively on Demand-Response Specs, Renew Grid, Mar. 31, 2011, 1 page.

Cannon Technologies, Inc., LCR 5000 Paging Load Control Receiver Technical Manual, 1999, 68 pages.

California Energy Commission, Open Automated Demand response Communications Specification (Version 1.0), Apr. 2009, 214 pages.

Cannon Technologies, Inc., DSM/2 Release 5.0 User Guide, Nov. 2001, 346 pages.

Cannon Technologies, Inc., "LCR 5000 Load Management System Functional Overview", 1999, 1page.

Cannon Technologies, Inc., "Cannon 900 MHz Flex™ Paging—Load Control Receiver", 199/2000, 3 pages.

Cannon Technologies, Inc., "ExpressStat™ Programmable Demand Response Therostat", 2002, 2 pages.

Cannon Technologies, Inc., "Load Response Center™", 2003, 2 pages.

Cannon Technologies, Inc., "Yukon™ software for Advanced Energy Services", 2002, 12 pages.

Cannon Technologies, Inc., "Yukon™ Energy Information Aggregation Curtailment Control for You Largest Customers", 2002, 4 pages.

Cannon Technologies, Inc., "Yukon™ Look how easy we've made load control . . . ", 2002, 4 pages.

Cannon Technologies, Inc., "Yukon™ substation.com—Intelligent Monitoring & Notification", 2003, 6 pages.

\* cited by examiner

DISTRIBUTED ELECTRICITY DEMAND-RESERVE PREDICTION

FIELD OF THE INVENTION

The present invention generally relates to electrical utility demand response, and more particularly to accurately predicting available electricity demand-reserve through selective control of distributed electrical loads.

BACKGROUND

Electricity generating and distributing utilities must be able to generate power sufficient to serve their customers' peak energy demand. It is well understood by those in the industry that the power required to meet customers' peak energy demand is the most expensive energy to produce. When the load on an electrical system approaches the maximum generating capacity, utilities must either find additional supplies of energy or find ways to reduce the load; otherwise, blackouts or other outages may occur.

Utilities often use demand-response programs to balance the supply of electricity on their network with the electrical load demand by adjusting or controlling the demanded load rather than controlling the power station output. Load shedding is one example of demand response wherein a utility may reduce demand by controlling the output of high-energy-usage loads, typically devices such as air conditioners, hot water heaters, pool heaters, and the like. By shedding load during peak demand periods, peak load demand is shifted to off-peak periods, thereby "smoothing" short-term peaks in load demand. Effective load shedding provides numerous benefits, including reduced energy cost and improved electrical supply reliability, among others.

Load shedding may be accomplished through the use of a communicative controller cooperating with a device, such as a relay, that interrupts power to the load based on commands from the utility company. Such controllers are well known in the art as load-control receivers ("LCRs") or load-control switches ("LCSs").

Load shedding is most effective in managing the duty cycle of cyclic loads. For example, an air conditioner may cycle on and off every fifteen minutes to maintain a constant building temperature. That duty cycle can be altered (by a utility company via an LCS, for example) to reduce energy usage without causing uncomfortable changes in room temperature. During a demand-response event, a utility master station may command the LCSs to turn off or otherwise alter their duty cycle in order to reduce peak power demand below the electrical supply.

A problem with current demand-response systems is that they are unable to accurately predict current and future demand, and therefore how much demanded load will be available to be shed at the start of a demand-response event. This available load is known by those having skill in the art as the "demand reserve." Accordingly, utilities generally use a rule-of-thumb guess to determine the proportion of units that can be cycled off, and for what duty cycle, sufficient to achieve the desired demand reduction.

Some prior art methods and devices have attempted to estimate demand reserve by considering weather information, historical data, and population statistics, among other parameters. For example, a group of residential air conditioners may be assumed to each be 1 kW of load (demand) at maximum, though such an assumed load may be de-rated based upon temperature. At temperatures greater than 95° F. one might assume 100% demand, and at 75° F. one might assume 10% demand. Relative humidity and cloud cover can also be considered in the prediction algorithm. These methods require periodic verification and the final computed population totals typically require a large degree of tolerance for decision making. Furthermore, such algorithms burden the master station software with large databases and/or complex computational requirements.

Other methods rely on gathering vast amounts of detailed data from the actual energy-consuming devices, then calculating real-time usage at a centralized server. Rather than relying on predictive, sampled data, such methods and devices, including those described in U.S. Pat. Nos. 8,032,233, 8,010,812, and 7,715,951, and related patent applications, to Forbes, Jr., et al., avoid statistical prediction techniques, and record actual energy usage of all energy-consuming devices in a region. The real-time data from the collective devices in a geographic region are transmitted to a centralized database for analysis, actual energy usage is calculated, and transmitted to a utility to use for load-shedding purposes. As such, actual demand reserve at any given time is known.

However, because such centralized demand reserve determining systems require that all energy-consuming devices report real-time data on a constant basis to a centralized database, extensive and complex infrastructure is required, including significant transmission bandwidth.

SUMMARY OF THE INVENTION

The invention disclosed and described herein substantially addresses the above described needs by providing distributed demand-reserve prediction systems, devices and methods for: (1) locally predicting future load demand of high-demand loads in the system; (2) transmitting load-demand predictions to a master control station, which determines an optimal load-shedding schedule based on aggregate predicted future load demand and system capacity; and (3) commanding devices attached to high-demand loads to turn off, or cycle off, to achieve the desired demand reduction.

In an embodiment of the present invention, a demand response, or load-control switch ("LCS") is placed on a high-energy-demand device, such as an air conditioner compressor, at each of many discrete facilities (especially residential facilities) within an electrical utility network. LCSs are typically capable of communicating with a utility master control station to transmit power-usage data and to receive demand-response commands. Furthermore, LCSs typically also include a relay or switch capable of initiating demand-response events by interrupting power transmission to the attached load.

Local load-demand predictions incorporate an algorithm that utilizes historical load-usage data to predict future load demand. In an embodiment, each LCS's load-sensing device continually monitors current draw by the attached device and stores that data in its memory. Because system voltage can be effectively assumed as constant, the current draw is proportional to power usage.

The LCSs then, locally, use an algorithm of the claimed invention to identify trends in the historical load data to predict future load demand for the attached device. The algorithm may analyze factors such as the maximum and mean load usage at a given time of day, and scaling factors to account for load trends, among other factors. It is often desirable to express predicted load with respect to day and time of day, since such loads vary considerably throughout a given day due to weather patterns, or other usage patterns.

A benefit of certain embodiments of the claimed invention is that each LCS can locally compute predicted load demand and can transmit that pre-computed data to a master station. Computational and storage requirements for the master station are thereby reduced, since the master station need only make basic calculations and commands on the data pre-analyzed by the LCSs. Each LCS is configured to cache predicted load demand and send this data to the master station at a random time within a given communication interval. Because there may be hundreds of thousands of LCSs in a given control system, the master station will receive data on a substantially continual basis. Random data transmission further prevents data communication spikes during discrete communication events. In certain embodiments of the claimed invention, additional data such as historical load-usage data and maximum load usage may also be communicated to the master station.

According to one aspect of the present invention, an electrical utility is able to tailor its load-shedding strategy to the usage of particular devices on its electrical system. As stated above, the master station receives predicted load demand from high-usage devices within its system. Since the load prediction calculations have already been computed by each LCS, the master station need only calculate the system's aggregate predicted load demand, compare the predicted load demand to the system's capacity, and, if needed, command devices to shed load.

In one aspect of the present invention, an electrical utility can compute "demand reserve." Demand reserve refers to the amount of load that is capable of being shed in a given system or region. Load shedding is most effective with cyclical loads, since those loads can remain on and/or off for a longer period of time than they are normally on or off, and can subsequently "recover" without an appreciable change in performance. The master station can analyze the predicted load data that it receives from LCSs in its system to determine the appropriate amount of load that is able to be shed, or the demand reserve, for each controlled device.

The master utility station constantly computes the predicted load demand to its energy capacity to determine if its capacity is sufficient. If the predicted load demand is higher than its current load output, the utility can either turn on additional generators, or can initiate a load-shedding event. Electrical utilities can improve reliability and efficiency by anticipating future load demand and understanding the amount of demand reserve that is capable of being shed at any given time. In the rare event that the demand above a utility's capacity is greater than its demand reserve, a utility can activate "peaker" generators or can purchase energy from another utility in order to avoid power outages.

Various embodiments of the present invention provides improved estimation of the load requirements and reserve demand that is capable of being shed for each controlled load, respectively. This comprehensive load and demand reserve prediction allows a utility to control attached loads individually based on each load's respective usage. Thus, embodiments of the present invention allows a utility to shed only the needed demand, thereby limiting the impact of load shedding events on individual customers.

BRIEF DESCRIPTION OF THE DRAWINGS

The invention may be more completely understood in consideration of the following detailed description of various embodiments of the invention in connection with the accompanying drawings, in which.

Figure 1A:
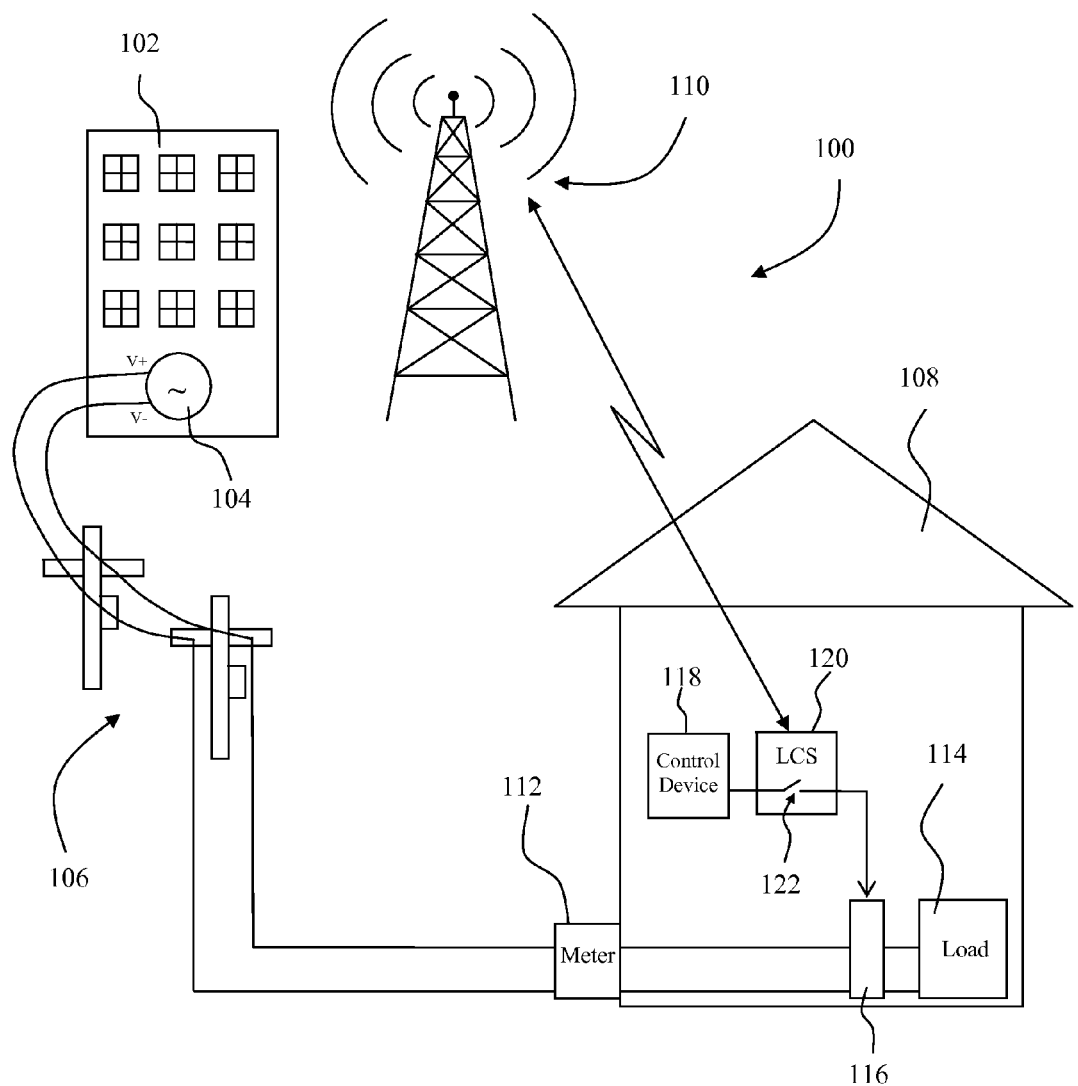
FIG. 1a depicts an electrical utility with a demand-response system that includes a stand-alone LCS, according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments of the claimed inventions disclosed and described herein substantially addresses the above described needs through its novel load-demand prediction system and method, and associated demand-response system and method. In one embodiment, load control switches ("LCSs") are individually installed on high-energy-demand devices within an electrical utility system. Individual LCSs are capable of monitoring the electrical load of the device to which they are attached, and using the historical load data to predict future load demand. The LCSs can then transmit such data to a master control station, which can utilize that data to determine optimal load-shedding parameters, which can then be transmitted back to each LCS to initiate load-shedding events.

FIG. 1a depicts an exemplary portion of an electrical utility with an electrical utility demand-response system 100. In the depicted embodiment, system 100 includes master station 102, electrical power source 104, power distribution network 106, facility 108, and communication network 110. Facility 108 includes meter 112, electrical load 114, control circuit 116, control device 118, and load-control receiver 120.

In such a system, master station 102 of an electrical utility typically includes electrical power source 104, from which AC power is transmitted via overhead or underground power distribution lines 106 to facilities or buildings 108. Electrical power source 104 can comprise one or a plurality of power generating facilities, for example, fossil fuel, hydroelectric, and nuclear power plants.

Master station 102 communicates with devices at facility 108 over long-haul communications network 110. Long-haul communications network 110 may comprise a wireless (depicted) or a wired network, with one-way or two-way communications ability. In a one-way network, master station 102 transmits load-control or load-shedding messages and commands to facility 108, but does not receive data back from facility 108. In a two-way communications system 110, master station 102 transmits such messages and commands, and also receives data from facility 108.

Long-haul communications network 110 may utilize wired or wireless communications, telephonic communications, Internet Protocol-based communications, satellite system-based communications, and the like. Examples of suitable communications systems include 900 MHz FLEX Paging, 154 MHz VHF Paging, wireless mesh network (WMN), and Power Line Carrier (PLC).

Facilities 108 are most often, but not limited to, residential or small commercial facilities. Electricity enters facility 108 through power meter 112 and is then distributed to various circuits within facility 108.

Power meter 112 may be a "smart meter" that could include energy monitoring and/or communication capabilities, such as automatic meter reading ("AMR") or advanced metering infrastructure ("AMI") technologies. In an embodiment, power meter 112 communicates with master station 102 over long-haul communications network 110. In another embodiment, power meter 112 may communicate with other devices at facility 108 via a short-haul communications network, as described further below and with respect to FIG. 2.

Facility 108, subject to demand response by master station 102, typically includes one or more loads 114. Loads 114 may comprise any electricity-consuming, high-energy usage device, including compressors of heating and air-conditioning systems, hot water heaters, pool heaters, and the like. Load shedding in accordance with the present invention is most effective with loads that cycle on and off during normal usage, such as compressors.

In an embodiment, power meter 112 is electrically coupled to load 114 to provide electricity to load 114 as controlled by control circuit 116. Control circuit 116 in an embodiment comprises an electrical contactor. Electrical contactor may comprise a relay device responsive to a received control signal to selectively connect and disconnect line voltage as supplied by meter 112 to load 114.

Control device 118 in electrical communication with LCS 120 may be any of a number of known controllers, including temperature control devices, such as a thermostat. Control device 118 generally controls operation of load 114 by transmitting a call-for-power control signal to load 114. In an embodiment, control device 118 comprises a thermostat that regulates a temperature of a space within facility 108 by causing load 114 to be powered on and off. In another embodiment, control device 118 similarly regulates a water temperature heated or cooled by load 114, such as a water heater or a pool. Control device 118 may be programmable, non-programmable, digital, mechanical, communicative, and so on. Control device 118 may operate on 24 VAC, line voltage, or another voltage as needed.

Load-control switch (LCS) 120 includes switching device 122. Switching device 122 comprises an electrically operated switch, which in an embodiment comprises a relay, which may be normally-closed single-pole, single-throw relay switch. Switching device 122 may also comprise other types of switching devices, including various types of known relays, and switching circuits or modules configured and/or programmed to interrupt a control or power line.

LCS 120 is in communication with master station 102 over long-haul network 110, and locally is in communication control device 118 and control circuit 116. As described further below with respect to FIGS. 4-6, LCS 120 receives a control signal from control device 118, and selectively closes and opens switching device 122, thereby allowing transmission of the control signal to control circuit 116, or preventing transmission of the control signal to control circuit 116.

Figure 1B:
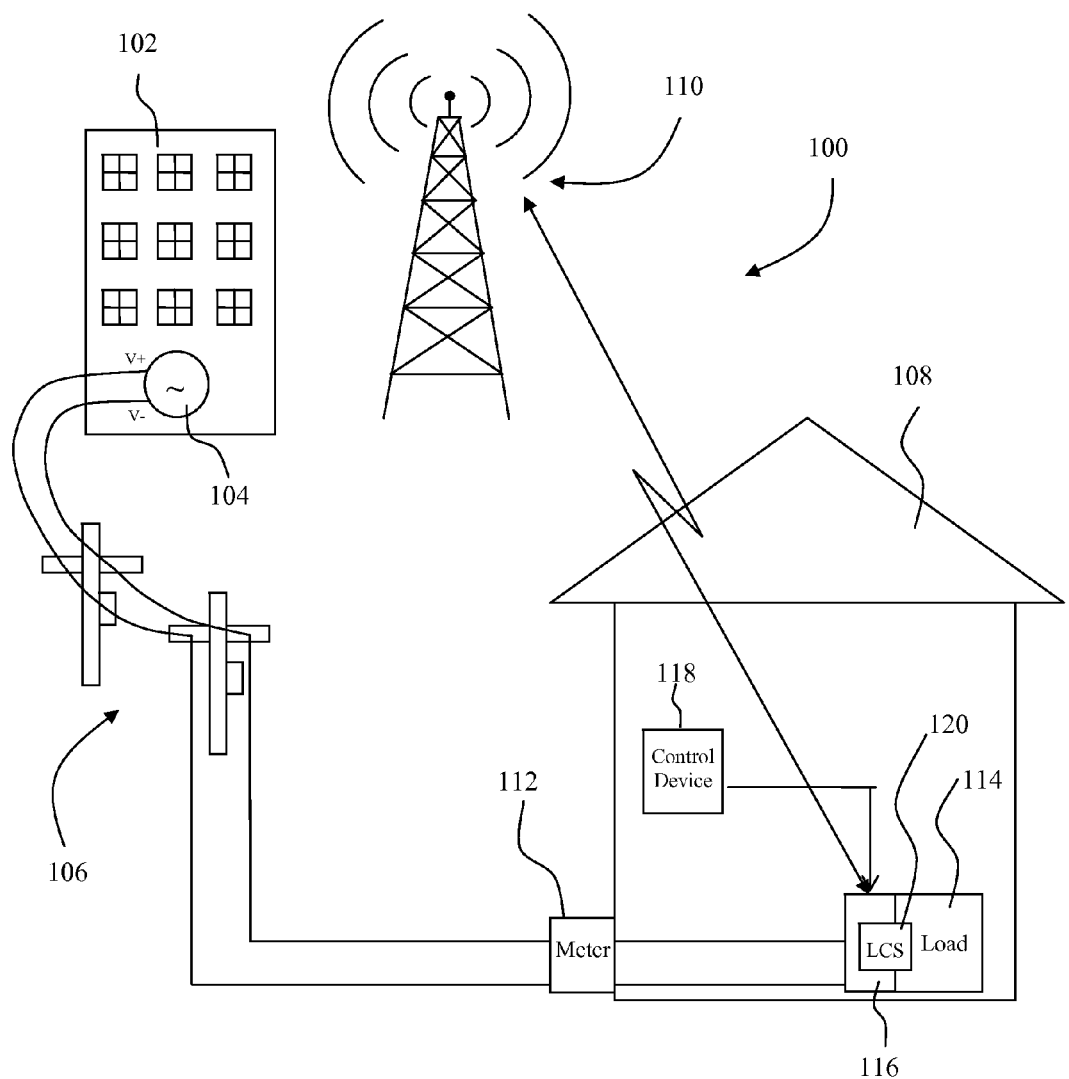
FIG. 1b depicts an electrical utility with a demand-response system that includes LCS capability integrated into the electrical load, according to an embodiment of the present invention.

Referring to FIG. 1b, an alternate embodiment of system 100 is depicted. The embodiment of system 100 as depicted in FIG. 1b is substantially the same as the embodiment depicted in FIG. 1a, with the exception of the physical location of LCS 120. In the embodiment of FIG. 1b, LCS 120 may be integrated into load 114 and/or its control circuit 116. In one embodiment, LCS 120 may be a stand-alone device housed at or in load 114, or may be more closely integrated into load 114 and/or control circuit 116 and share mechanical or electrical componentry. Generally, any or all of LCS 120 components could be present inside of load 114, either with another external LCS 120 or in direct communication with meter 112 or master station 102.

In one such embodiment, LCS 120 may not comprise a relay, but rather comprises a communications module in electrical communication with control circuit 116, which in an embodiment is co-located with load 114.

Figure 2:
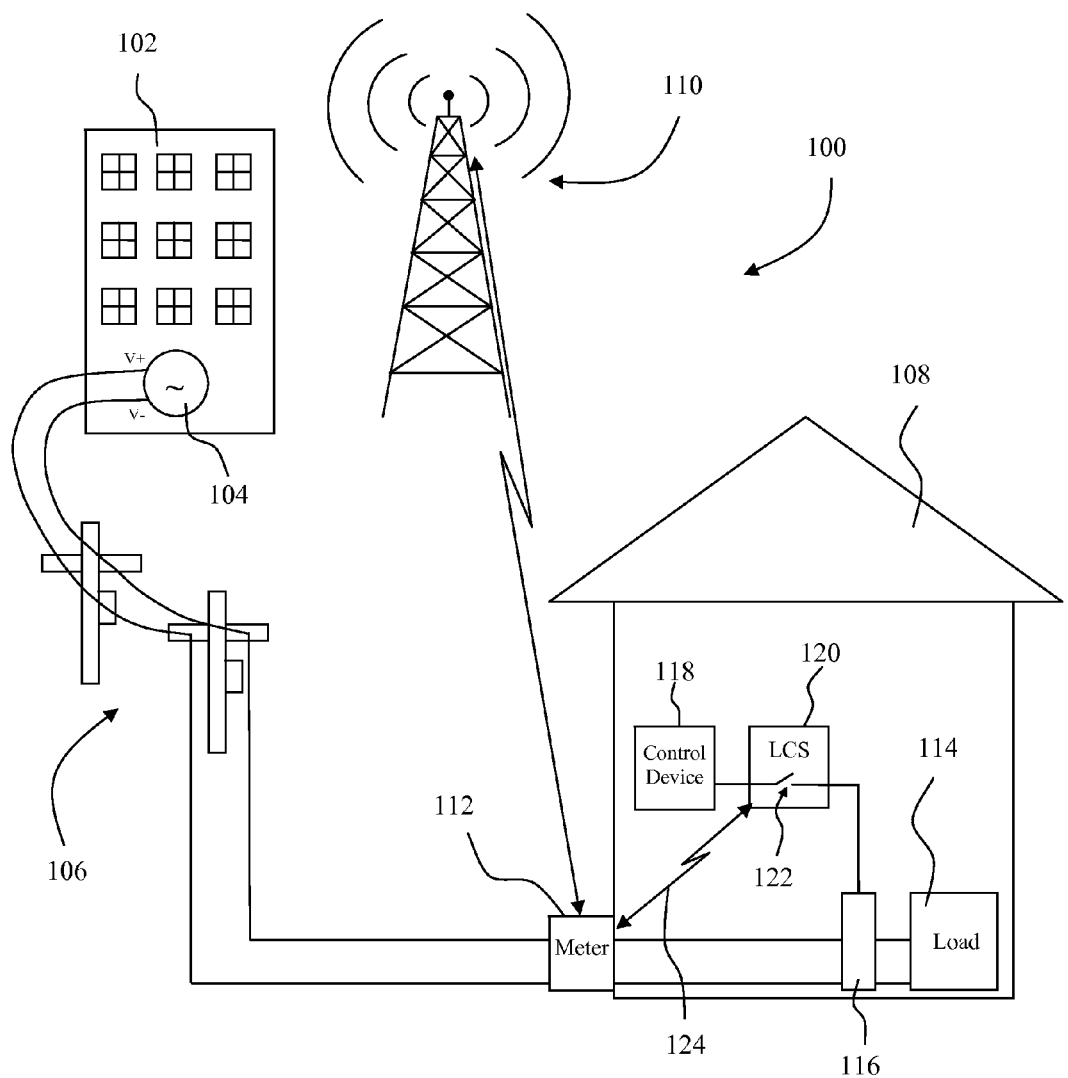
FIG. 2 depicts another electrical utility with a demand-response system, according to an embodiment of the present invention.

Referring also to FIG. 2, another embodiment of system 100 is depicted. System 100 is substantially the same as system 100 as depicted in FIG. 1, with the primary exception of communications.

As depicted in FIG. 1, master station 102 communicates over long-haul communications network directly to LCS 120. In the depicted embodiment, meter 112 comprises a non-communicative device.

In the alternate embodiment of FIG. 2, master station 102 communicates with meter 112, which is a communicative meter, such as a smart meter, over long-haul communications network 110. Meter 112, in addition to being configured to communicate over long-haul communications network 110, may also include short-haul communications capability, such that meter 112 communicates over short-haul network 124 with one or more devices at facility 108, including LCS 120. In such an embodiment, meter 112 is configured for long-haul and short-haul communications, while LCS 120 is configured for at least short-haul communications. Short-haul communications network 124 may include, but are not limited to, ZigBee®, Bluetooth®, WiFi®, and various Internet Protocol-based communications.

Figure 3:
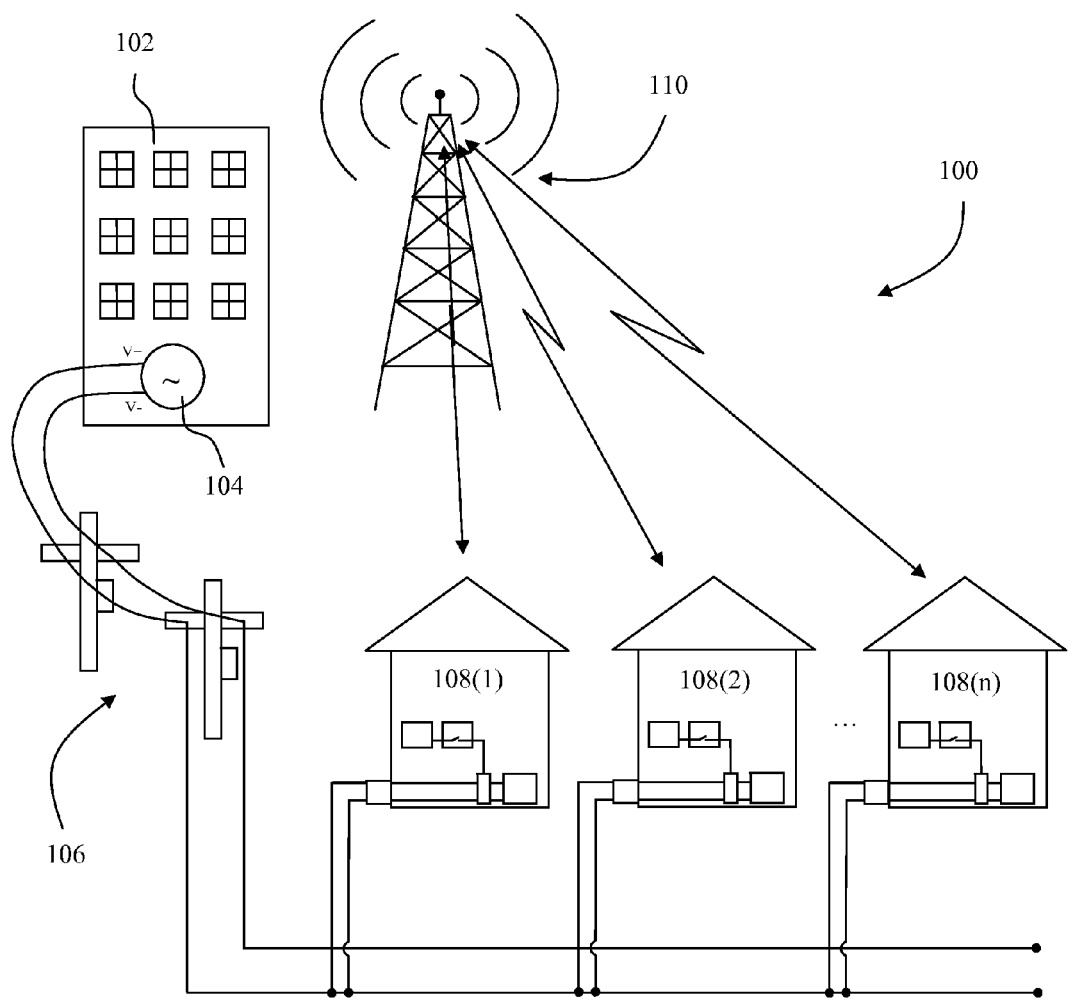
FIG. 3 depicts an electrical utility with a demand-response system, illustrating a plurality of facilities in the system, according to an embodiment of the present invention.

For the purposes of illustrating the present invention, FIGS. 1 and 2 depict a single facility 108 in demand-response system 100. However, as illustrated in FIG. 3, demand-response systems 100 typically include multiple facilities 108, with some demand-response systems 100 comprising 100,000 or more facilities 108. Likewise, a single facility 108 may include multiple LCSs 120 to control multiple loads 114.

Figure 4:
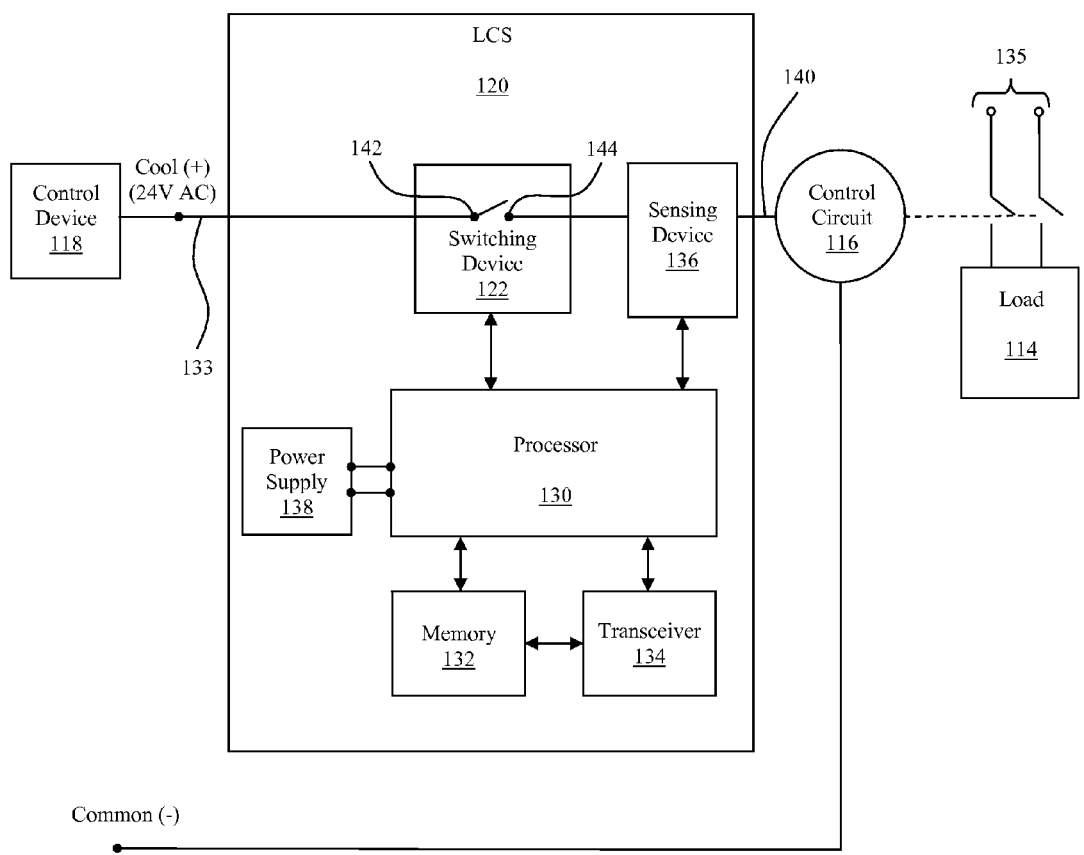
FIG. 4 is a block diagram depicting a load control receiver with a power sensing device that determines load by monitoring the absence or presence of a control signal to a control circuit in communication with an electrical load, according to an embodiment of the invention.

Referring to FIG. 4, an embodiment of LCS 120 in electrical communication with control device 118 and control circuit 116 (depicted as an electrical contactor) is depicted. LCS 120 typically includes switching device 122, processor 130, memory 132, radio transceiver 134, load sensing device 136, and power supply 138.

As described in part above with respect to FIGS. 1a and 1b, switching device 122 of LCS 120 may comprise any relay, switching device, or switching function capable of interrupting the control signal of attached load 114 or alternatively directly interrupting power transmission to attached load 114. Processor 130 may comprise a microprocessor, microcontroller, microcomputer, or any suitable logic controller capable of performing calculations on measured data, reading from and writing to memory 132, and controlling electrical components such as radio transceiver 134.

Memory 132 may comprise EEPROM or other suitable non-volatile computer readable memory capable of storing data including current, voltage, or power data. Alternatively, memory 132 may also comprise volatile computer readable memory, or a combination of volatile and non-volatile computer readable memory in certain embodiments. Such embodiments include non-transitory, computer-readable storage mediums storing instructions to be implemented by processor 130 and LCS 120.

Radio transceiver 134 in certain embodiments comprises both a transmitter and receiver for transmitting and receiving data, and in other embodiments comprises a receiver for receiving data only. Radio transceiver 134 can utilize a wide variety of communication methods for communicating over long-haul networks (e.g., from LCS 120 to master control station 102), and over short-haul networks (e.g., from LCS 120 to meter 112). Radio transceiver 134 may utilize any suitable communications format and medium, including the long-haul and short-haul communication interfaces and protocols discussed above with respect to FIGS. 1 and 2.

Load-sensing device 136 is in electrical communication with control line 140 and processor 130. In an embodiment, load-sensing device 136 is configured to detect the presence or absence of a control signal at control line 140. As described further below, the presence of a control signal at line 140 indicates that load 114 is receiving power via control circuit 116 without interruption from LCR 120. The absence of a control signal at line 140 indicates that load 114 is not powered. Load-sensing device 136 may facilitate connection of processor 130 to control line 140, or may transmit an output signal representative of a control voltage or current to processor 130.

Load-sensing device 136 may detect or measure current and/or voltage at control line 140, and may utilize a variety of technologies, including a resistive shunt, a Hall-effect device, or an inductive sensor. In an embodiment, load-sensing device 136 is a voltage detector, such as a trigger sense circuit, that samples a voltage at line 140 at a sampling frequency $f_{samp}$. In another embodiment, processor 130 may be capable of receiving an input directly from control line 140, such that load-sensing device 136 simply comprises a conductive element connecting control line 140 to processor 130.

Although depicted as a device or circuit integral to LCS 120, it will be understood that load-sensing device 136, while in communication with LCS 120 and its processor 130, may be external to LCS 120 thusly comprising a stand-alone device.

Power supply 138 may be any power supply capable of conditioning and supplying power to LCS 120 components, such as processor 130.

In general operation, and when LCS 120 is not being commanded to control load 114 such that switching device 122 is closed (first terminal 142 and second terminal 144 are electrically connected), control device 118 selectively outputs or transmits a call-for-power control signal via control line 133 and control line 140 to load 114 via LCS 120. In an embodiment, control device 118 outputs a 24 VAC control signal to cause control circuit 116 to connect load 114 to line voltage at power terminals 135, such that load 114 is operational. In the embodiment wherein control device 118 comprises a thermostat, and load 114 comprises an AC compressor, control device 118 transmits a call-for-power, or a call-for-cool control signal, through LCS 120 to load 114 when a space temperature of facility 108 rises above a predetermined set point. Control circuit 116 causes compressor load 114 to connect to power and to run, thereby cooling the space. When the space temperature reaches the temperature set point, or control device 118 is otherwise satisfied, control device 118 ceases to transmit the call-for-power signal to control circuit 116, such that control circuit 116 disconnects load 114 from terminals 134, thus disconnects power to load 114.

During a load-control event such that LCS 120 limits operation of load 114, switching device 122 is in an open position, such that first terminal 142 and second terminal 144 are not electrically connected. In such an embodiment, even if control device 118 outputs a call-for-power control signal, LCS 120 prevents the call-for-power control signal from being transmitted to control circuit 118 and control circuit 116, such that load 114 is not connected to power, and is not running.

Throughout these operations, processor 130, in conjunction with sensing circuit 136, regularly monitors or samples control line 140 to sense the presence or absence of a control signal, such that processor 130 may determine and store information relating to on and off cycles of load 114 in memory 132.

In an embodiment, the sampling frequency $f_{samp}$ is twice per second. Processor 130 stores the measured data into memory 132. Processor 130 then utilizes the recorded data to determine the percentage of time that the compressor was running, which is known as its "duty-cycle." Power usage P(t) can be expressed in terms of duty-cycle (runtime) at $P_{max}$.

Figure 5:
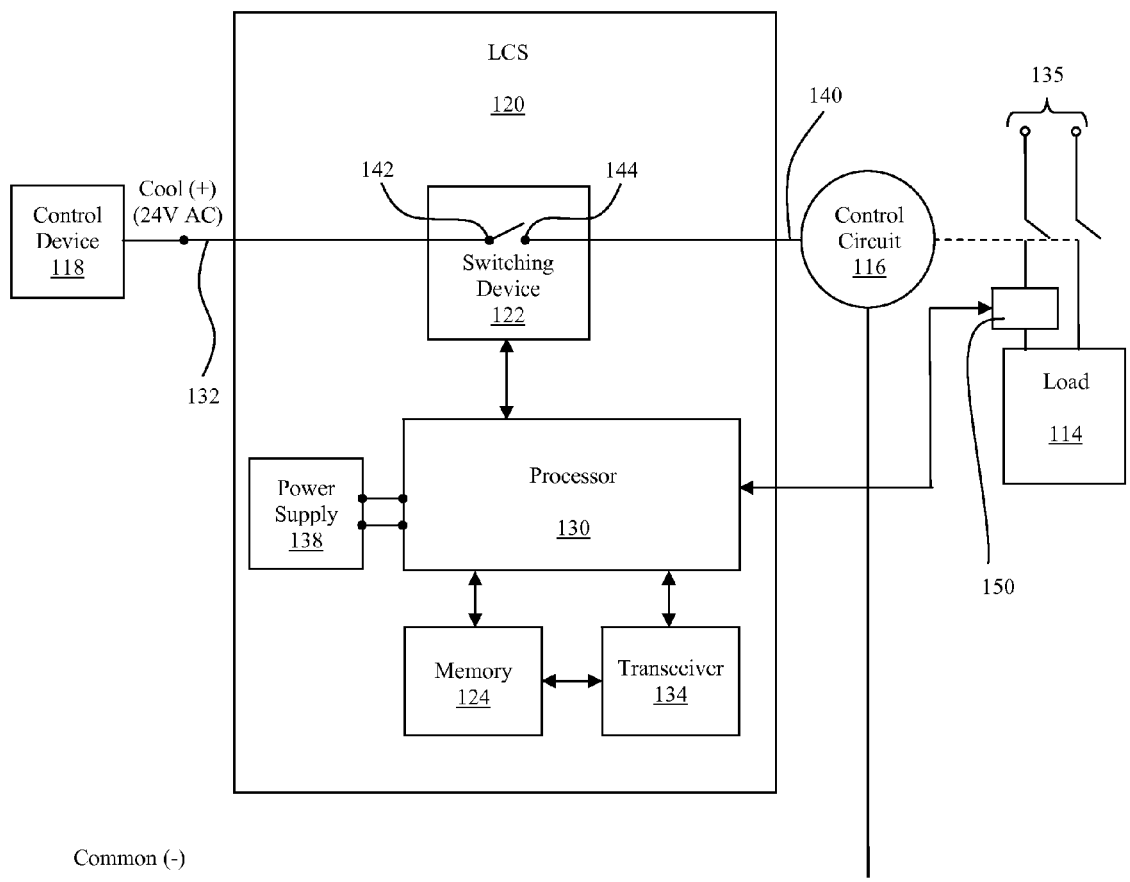
FIG. 5 is a block diagram depicting a load control receiver with a power sensing device that determines load by measuring current at an electrical load, according to an embodiment of the invention.

FIG. 5 depicts an embodiment of LCS 120 adapted to communicate with load-measuring device 150, rather than load-sensing device 136. This arrangement is similar to the first power sensing arrangement, except that load sensing device 150 is electrically coupled to a power line 134 entering compressor load 114, providing data to processor 130.

In an embodiment, load-sensing device 150 may simply sense that presence or absence of a voltage or current flow at load 114, thereby sensing whether load 114 is powered. In such an embodiment, load-sensing device 150 transmits a signal to processor 130 indicating the presence or absence of power to load 114, such that processor 130 may determine and store information relating to on and off cycles of load 114 in memory 132. As such, load-sensing device 150 is similar to load-sensing device 136, in that both devices provide data for determining on and off cycles of load 114, but do not provide actual power measurements.

In another embodiment, and still referring to FIG. 5, load-sensing device 150 comprises a load-measuring device, such as a device that measures power or current. In this embodiment, load sensing device 150 may comprise a Hall-effect device, an inductive sensor, or any current or load sensors. Load sensing device 150 in an embodiment measures the actual magnitude of current on power line 134 at load 114.

In this embodiment, it may be desirable to utilize a higher sampling frequency $f_{samp}$ to measure gradation in load, especially if compressor or load 114 utilizes variable-rate output. Because line voltage is effectively constant, power P(t) can be easily calculated by processor 130 by calculating the product of line voltage 134 and the measured current.

Referring also to FIG. 2, in an alternate embodiment, rather than measure actual current or power at load 114, LCS 120 receives power information from meter 112. In this embodiment, LCS 120 and power meter 112 may communicate via short-haul wireless networks such as Zigbee or Internet Protocol networks, and may utilize "smart networks" such as EkaNet™. In certain embodiments that utilize a "smart" meter 112, accurate load usage data available from power meter 112 may obviate the need for an additional power sensing devices such as load-sensing devices 136 and 150.

Figure 6:
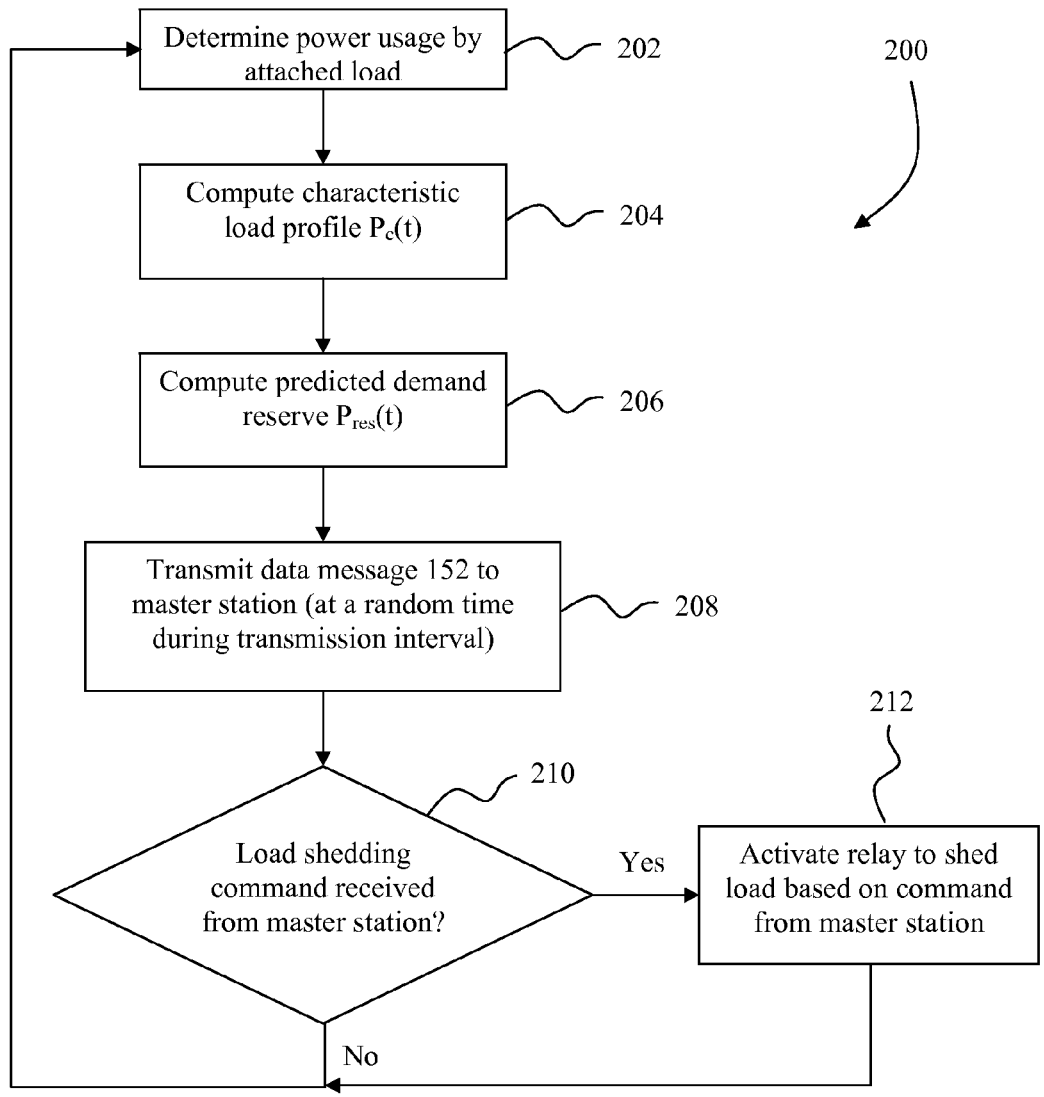
FIG. 6 is a flow diagram illustrating the demand-response process completed by a load control receiver, according to an embodiment of the present invention.

Referring to FIG. 6, a flowchart depicting an embodiment of the operation of LCS 120 is depicted. At step 202, LCS 120 determines the power usage P(t), or a characteristic of the power usage P(t) associated with attached load 114. Power usage P(t) can be detected or determined in a number of ways, including those described above and including, but not limited to: (i) directly measuring current magnitude and multiplying the current magnitude by the expected or measured line voltage (ii) sensing the presence or absence of current or voltage to load 114, using that data to calculate the duty-cycle (run-time) of the attached load 114, and calculating power usage P(t) by multiplying the maximum power rating of the attached load 114 $P_{max}$ by the duty-cycle; (iii) sensing the presence or absence of a control voltage or current to control circuit 116, using that data to calculate the duty-cycle (run-time) of the attached load 114, and calculating power usage P(t) by multiplying the maximum power rating of the attached load 114 $P_{max}$ by the duty-cycle.

In step 202, as illustrated above, LCS 120 monitors the power usage P(t) of attached load 114 and stores the measured power usage P(t), also referred to as measured load P(t), in memory 132, which can be expressed as actual power (Watts) and/or as duty-cycle. In accordance with the description above, it will be understood that "measured" power usage P(t) may comprise a power usage that is a directly measured power of the load, may comprise a value or function based on a measured characteristic of the power usage of the load, such as current, duty cycle, and so on, may comprise a power usage calculated using a known characteristic of the load, such as a predetermined run time or duty cycle, or may comprise other such determined or calculated power usages consistent with the description of the present invention. In an embodiment of the present invention, the measured load P(t) is averaged over time period T, which is longer than a time period corresponding to a sampling frequency $f_{samp}$. Time period T may be chosen to be sufficiently long so as to encompass a sustained load so that intermittent load spikes or data irregularities are filtered out, and to reduce computation and communication burdens to a suitable level. In various embodiments, suitable time periods T range from 15-60 minutes. In other embodiments, additional data analysis techniques may be utilized to condition and/or analyze the acquired data. Any known signal conditioning or computational methods may be used alternatively, or in combination, with the above described analyses within the spirit and scope of the invention.

As such, in an embodiment, P(t) may comprise a calculated average electrical power of load 114 based upon an actual power characteristic, such as power or current, sampled over a predetermined time period T.

In step 204 of process 200 as depicted in FIG. 6, LCS 120 computes a characteristic load profile $P_c(t)$ of attached load 114. As described above, power usage of high demand loads often follow similar usage patterns day after day because load demand is often dictated by weather conditions or other usage patterns. Characteristic load profile $P_c(t)$ represents the typical load demand of attached load 114 at a particular time t.

T is the duration of time, typically measured in a number of minutes, of each sampled interval, over which interval the average is calculated. t is the time of day that marks the start of an interval of length T. t may be designated as a point in time measured in minutes. In an embodiment, t ranges from 0 minutes at midnight, to 1439 minutes at the end of a day, or one minute before midnight. In such an embodiment, t ranges from 0 to 1439 for a particular day. When t is measured relative to midnight at the start of a current day (t=0), t may be a positive number indicating the current day, but may also be a negative number indicating the time in previous day(s). In an embodiment, t is a multiple of T for ease of computation and data storage.

Characteristic load $P_c(t)$ may be calculated by a number of different algorithms. In an embodiment of the present invention, the characteristic load $P_c(t)$ is calculated by taking a windowed moving average of the determined power usage, or load P(t,) at a discrete portion of a day (of length T) over the previous m days, wherein m=8, in an embodiment. In an embodiment, a daily characteristic load $P_c(t)$ may be understood by Equation 1 below:

$$P_c(t) = \frac{\sum_{n=1}^{m} P(t - 1440 * n)}{m} \qquad \text{Equation 1}$$

In the above Equation 1, t is expressed in minutes, so each step of the summation considers the measured load P(t) one day (24*60=1440 minutes/day) prior. $P_c(t)$ thus provides an estimate of the expected (characteristic) power usage of a load 114 with respect to the time of day.

The above characteristic load algorithm may be further adapted to include a weighting factor, wherein more weight is given to more recent days than to less recent days. Load demand is influenced by factors such as weather, which, in general, does not change greatly day-to-day. Generally speaking, yesterday's high temperature is a better indicator of today's high temperature than is last week's high temperature. Similarly, recent load demand is a better indicator of future load demand, and therefore may be accorded more weight, than less-recent load demand.

In step 206 of process 200, LCS 120 computes the predicted demand reserve load $P_{res}(t)$ for an individual attached load 114. The predicted demand reserve load $P_{res}(t)$ represents an estimation of the maximum amount of power from an individual load that a utility may shed at a given time t, during a demand response event. In other words, should a utility command a particular LCS 120 to shed its load, $P_{res}(t)$ represents the approximate power decrease to the overall electrical grid.

In one embodiment, $P_{res}(t)$ is simply equal to the characteristic power of load 114, $P_c(t)$. However, more accurate predictions of available reserve power $P_c(t)$ may be determined.

In one such embodiment, predicted demand reserve $P_{res}(t)$ is calculated using characteristic load $P_c(t)$ and a scaling factor S(t), which may account for short-term trends in load demand P(t) due to any number of factors, including changes in weather. In an embodiment, $P_{res}(t)$ may be calculated by Equation 2 below:

$$P_{res}(t)=P_c(t)*S(t) \quad \text{Equation 2:}$$

In an embodiment, scaling factor S(t) is calculated by taking the ratio of the previous measured load P(t−T) with the characteristic load at that time, $P_c(t-T)$. While the characteristic load $P_c(t)$ provides a general estimate of the load at a discrete portion of a day, scaling factor S(t) adjusts this estimate by taking into consideration short-term changes in load. In other words, characteristic load $P_c(t)$ can be understood to characterize day-to-day load-demand trends, whereas scaling factor S(t) can be understood to characterize short-term load-demand trends, such as hour-to-hour load-demand trends.

The scaling factor S(t) according to an embodiment of the present invention may be understood by Equation 3 below:

$$S(t) = \frac{P(t-T)}{P_c(t-T)} \quad \text{Equation 3}$$

The characteristic load $P_c(t)$ and scaling factor S(t) are used to calculate a predicted demand reserve load $P_{res}(t)$. With this definition S(t) is a function of P(t−T). As such, S(t) at a given or current time t is based upon inputs occurring in the past, or prior to time t. Some other definitions of S(t) may be able to forecast S(t) into the future, using other information.

It is beneficial for electrical utilities to be able to predict not just their present demand reserve, but also predict their future demand reserve $P_{res}(t)$ in order to anticipate and prepare for potential load-shedding events.

In an embodiment, the present invention utilizes the characteristic load at a discrete time period k intervals in the future, future characteristic load, $P_c(t+kT)$ (where k is an integer) and scaling factor S(t) to calculate demand reserve at a future time period $P_{res}(t+kT)$, future demand reserve. Note that the scaling factor S(t) may depend upon sampled load P(t), so short-term demand reserve predictions may be more accurate than long-term demand reserve predictions. In one embodiment, future demand at future time t+kT, $P_{res}(t+kT)$ may be understood by Equation 4 below:

$$P_{res}(t+kT)=P_c(t+kT)*S(t) \quad \text{Equation 4:}$$

The above-described analysis and calculations are accomplished by each individual LCS 120, rather than at a centralized server, such as a server at a substation or utility. As such, embodiments of the claimed invention comprise distributed demand-reserve prediction systems, with demand reserve predictions and calculations taking place at the site of the electrical load.

In step 208 of process 200, in an embodiment, LCS 120 transmits data message 152 to master station 102 at time t. Data message 152 can include predicted load information, including maximum load $P_{max}$, demand reserve load $P_{res}(t)$, determined load P(t), and characteristic load $P_c(t)$, among other things, or any combination of the same. Tables 1 and 2 below illustrate possible data messages 152, according to embodiments of the invention each returning data for q intervals.

TABLE 1

Data message 152 according to one embodiment

| $P_{max}$ | $P_{res}(t)$ | $P_{res}(t + T)$ | $P_{res}(t + 2T)$ | $P_{res}(t + 3T)$ | ... | $P_{res}(t + qT)$ |

TABLE 2

Data message 152 according to another embodiment

| $P_{max}$ | $P_{res}(t)$ | $P_{res}(t + T)$ | $P_{res}(t + 2T)$ | $P_{res}(t + 3T)$ | ... | $P_{res}(t + qT)$ |
| | P(t) | P(t − T) | P(t − 2T) | P(t − 3T) | ... | P(t − rT) |
| | $P_c(t)$ | $P_c(t + T)$ | $P_c(t + 2T)$ | $P_c(t + 3T)$ | ... | $P_c(t + qT)$ |

In one embodiment, LCSs 120 are configured to cache the data included in data message 152, and store that data in memory 132 until data message 152 is sent to master station 102. LCSs 120 can be configured to send data message 152 at a specified interval. In doing so, electrical utilities can manage communication events between LCSs 120 and master station 102 so that the burden on the communication system 110 is relatively constant, as opposed to spiking during discrete communication events. In one embodiment, LCSs 120 are configured to send data messages 152 at a random time within a specified communication interval, for example, within a 2 hour period. Because a given electricity distribution system may contain tens of thousands of LCSs 120, initiating communication events at a random time within a communication interval results in master station 102 receiving data messages 152 from various LCSs 120 on a virtually continual basis.

Figure 7:
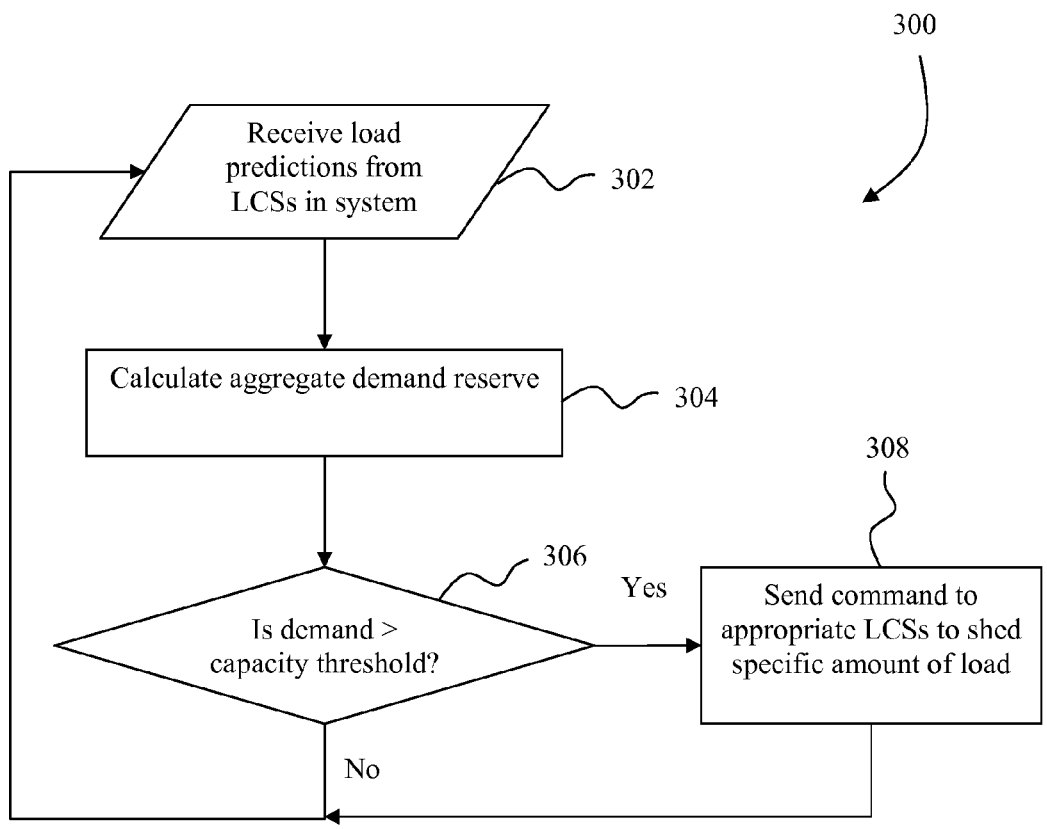
FIG. 7 is a flow diagram illustrating the demand-response process completed by a master control station, according to an embodiment of the present invention.

Referring also to FIG. 7, step 302 of demand response operation 300 involves master control station 102 receiving data messages 152 from LCSs 120, per step 208 as described above.

In step 304 of demand response operation 300, master control station 102 calculates aggregate demand reserve of system 100 based on data and messages received from multiple LCSs 120 of system 100. Because it is receiving data sets on a virtually continual basis and the "youngest" predicted demand reserve values are most accurate, master station 102, in an embodiment, may estimate the aggregate demand reserve over a time period X, which may be shorter than the LCS 120 communication interval.

In one such embodiment, X may be a time period with a length of 5 minutes. To predict the aggregate demand reserve, the master station 102 need only multiply the sum of the demand reserves of each LCS 120 reporting during period X, by the total number of LCSs 120 in the system, and divide that value by the total number of LCSs 120 sampled in period X. LCSs 120 reporting during period X are assumed to be representative of the total population of LCSs 120. As such, the number of LCS units 120 reporting in the interval X should be sufficiently large. Further, since some LCSs 120 will have transmitted updated data sets within the previous time period X, the master system's aggregate demand reserve predictions will become more accurate each time they are calculated. Computational demand on the master station 102 is low because each LCS 120 locally predicts future demand reserve and the master station 102 then performs very simple calculations therefrom.

In certain embodiments in which data message 152 includes measured load P(t), demand reserve load $P_{res}(t)$ and/or characteristic load $P_c(t)$, master control station 102 can compare measured load P(t) to demand reserve load $P_{res}(t)$ and/or to characteristic load $P_c(t)$ in order to analyze error and to iteratively alter the demand reserve load $P_{res}(t)$ and/or to characteristic load $P_c(t)$ algorithms in order to minimize error.

The aggregate demand reserve for a future point in time, $P_{AggRes}(t+kT)$, is as follows:

$$P_{AggRes}(t + kT) = \frac{N}{n(X)} \sum_{i=1}^{n(X)} P_{res_i}(t + kT) \quad \text{Equation 5}$$

$$k \in [0, q)$$

Where: n(X)=number of LCSs reporting in the interval X; N=the total number of LCSs 120 in the system; and q=final interval reported in data message 152

Equation 5 assumes that each LCS 120 reporting in the interval X represents 1/Nth of the total load. While this assumption may be adequate, in another embodiment for estimating aggregate demand reserve, Equation 6 below, improves upon the assumptions of Equation 5 in estimating aggregate demand reserve:

$$P_{AggRes}(t + kT) = \frac{P_{TOT}}{\sum_{i=0}^{n(X)} P_{max_i}} \sum_{i=1}^{n(X)} P_{res_i}(t + kT) \quad \text{Equation 6}$$

$$k \in [0, q)$$

Where: $P_{TOT} = \sum_{i=0}^{N} P_{max_i}$; n(X)=number of LCRs reporting in the interval X; N=the total number of LCRs 120 in the system; and q=final interval reported in data message 152

Determining aggregate demand reserve based on Equation 6 allows for determining what portion of the total load has been received during the interval X, which generally provides a better scaling factor as opposed to Equation 5.

Equation 7 comprises yet another embodiment for determining aggregate demand reserve, $$P_{AggRes}(t + kT) = \frac{P_{TOT}}{n(X)} \sum_{i=1}^{n(X)} \frac{1}{P_{max_i}} P_{res_i}(t + kT) \quad \text{Equation 7}$$

$$k \in [0, q)$$

Where: $P_{TOT} = \sum_{i=0}^{N} P_{max_i}$; n(X)=number of LCRs reporting in the interval X; N=the total number of LCRs 120 in the system; and q=final interval reported in data message 152.

Equation 7 allows for scaling of the individual reserve calculations of each LCS 120, rather than of the group of LCSs 120 accumulated over the interval X.

After determining aggregate demand reserve, in step 306 of demand response operation 300 a master control station 102 compares the aggregate demand reserve of system 100 to the electrical capacity of system 100. This calculation can be completed with respect to the demand reserve at various points in time. Per step 308, if the demand reserve is greater than the electrical capacity of the system 100, master control station 102 can send commands over communication system 110 to specific LCSs 120 in order to initiate load shedding events. Because master control station 102 has specific demand reserve data from each LCS 120, load shedding events can be optimized by commanding individual LCSs 120 to shed specific amounts of load. Accordingly, excess load shedding that may result in uncomfortable operation may be avoided.

Referring back to FIG. 6, step 210 involves LCSs 120 monitoring communications with master control station 102 to watch for load-shedding commands from master station 102. If LCS 120 receives a load-shedding command from master station 102, step 212 provides that LCS 120 activates switching device 122, which interrupts the power available to attached load 114.

As described above, embodiments of the claimed invention comprise methods, systems, and devices directed to determining electrical demand reserve power.

In one such embodiment, the claimed invention includes a method of determining available electrical demand reserve at a premise remotely located from an electrical utility and having a communicative load-control switch (LCS) controlling an electrical load, the method comprising: sampling an electrical signal associated with the electrical load; determining a power usage of the electrical load based on the sampled data associated with the electrical load; storing in a memory device at the premise the power usage of the electrical load; determining a characteristic load profile of the electrical load based on the power usage of the electrical load; and determining at the premise an electrical demand reserve of the electrical load based on the determined characteristic load profile of the electrical load.

In an embodiment, sampling an electrical signal associated with the electrical load may include sampling an electrical signal over a predetermined sampling period T having a predetermined duration and starting at a predetermined time of day t and ending at a time t+T and/or sampling an electrical signal associated with the electrical load may include checking multiple times for the presence or absence of a 24V control signal transmitted to the LCS over a predetermined sampling period.

Further, storing in a memory device at the premise the power usage of the electrical load may include storing in a memory device of the LCS the power usage of the electrical load. and determining a characteristic load profile of the electrical load based on the power usage of the electrical load may include calculating an average power usage for the electrical load over a predetermined number of days for the electrical load, for a predetermined time period T, the predetermined time period T starting at substantially the same time t on each of the days. Calculating an average power usage for the electrical load over a predetermined number of days for the electrical load, for a predetermined time period T, the predetermined time period T starting at substantially the same time on each of the days may comprise calculating an average power usage according to the equation:

$$P_c(t) = \frac{\sum_{n=1}^{m} P(t - 1440 * n)}{m}$$

wherein Pc(t) is the characteristic power, m is the predetermined number of days, and t is a $t^{th}$ minute of a day n, and where t ranges from 0 to 1439.

In another embodiment, the claimed invention comprises a communicative load-control switch for controlling an electrical load at a premise remotely located from an electrical utility and determining an available electrical demand reserve of the electrical load, comprising: a switching device configured to receive a control signal from a control device and to selectively transmit the control signal to a control circuit of an electrical load; a transceiver configured to receive a communication signal, the communication signal including load-control commands for selectively controlling the switching device, and to transmit predicted load information; a processor in communication with the switching device and the transceiver, the processor configured to determine predicted load information of the electrical load; wherein the transceiver is further configured to transmit a data message that includes the predicted load information of the electrical load for aggregation at a remote site. The predicted load information may include a predicted current demand reserve or a predicted future demand reserve.

In an embodiment, the load-control switch comprises a memory device in communication with the processor, the memory device storing the predicted load information.

In another embodiment, the claimed invention includes a method of determining an aggregate electrical demand reserve of a plurality of distributed electrical loads, each electrical load being controlled by a load-control switch, comprising: receiving a first data message transmitted from a first load-control switch controlling a first electrical load supplied by an electrical utility, the first data message including a predicted electrical demand reserve of the first electrical load as determined by a processor of the first load-control switch; receiving a second data message transmitted from a second load-control switch controlling a second electrical load supplied by the electrical utility, the second data message including a predicted electrical demand reserve of the second electrical load as determined by a processor of the second load-control switch; and determining an aggregate electrical demand reserve for a plurality of electrical loads supplied by the electrical utility, the plurality of electrical loads including the first electrical load and the second electrical load, each of the plurality of electrical loads having an associated load-control switch, the determination being based on the received predicted electrical demand reserve of the first electrical load and the predicted electrical demand reserve of the second electrical load.

In one such embodiment, the predicted electrical demand reserve of each of the first electrical load and the second electrical load includes a future demand reserve. In another such embodiment the predicted electrical demand reserve comprises a characteristic power usage of the first electrical load. The characteristic power usage may be determined by the processor of the first load-control switch based on multiple sample measurements of a characteristic of the power usage of the first electrical load taken over a predetermined period of time. The characteristic power usage may further be determined based on a duty cycle of the first electrical load.

In another embodiment of such a method, the predicted electrical demand reserve of the first and the first electrical load includes a predicted electrical demand reserve for the first electrical load for a first time $t_1$ and a second time $t_2$, the second time $t_2$ being later than the first time $t_1$.

In another embodiment of such a method, the first data message is received at a first time that is different than a second time that the second data message is received and/or the first time and the second time are random times. Receiving the first data message and the second data message may occur within a predetermined time interval. The method may further comprise receiving additional data messages transmitted from additional load-control switches controlling additional electrical loads supplied by the electrical utility, the additional data messages including additional predicted electrical demand reserves of the additional electrical loads as determined by respective processors of the additional load-control switches, the additional data messages combined with the first data message and the second data message defining total data messages received, the total data messages received being received within a predetermined time interval; and wherein determining an aggregate electrical demand reserve for a plurality of electrical loads supplied by the electrical utility comprises summing the predicted demand reserves of the total data messages received within the predetermined time interval, dividing the sum by a number of load-control switches providing the total data messages received, thereby determining an average predicted demand reserve per load-control switch reporting during the predetermined time interval, and multiplying the average predicted demand reserve per load-control switch reporting during the predetermined time interval by a number of the plurality of load-control switches.

In another such embodiment, the method may further comprise receiving additional data messages transmitted from additional load-control switches controlling additional electrical loads supplied by the electrical utility, the additional data messages including additional predicted electrical demand reserves of the additional electrical loads as determined by respective processors of the additional load-control switches, the additional data messages combined with the first data message and the second data message defining total data messages received by a total number of reporting load-control switches, the total data messages received being received within a predetermined time interval; wherein determining an aggregate electrical demand reserve for a plurality of electrical loads is determined by the equation:

$$P_{AggRes}(t+kT) = \frac{N}{n(X)} \sum_{i=1}^{n(X)} P_{res_i}(t+kT)$$

$$k \in [0, q),$$

$P_{AggRes}(t+kT)$ representing the aggregate electrical demand reserve at a future time t+kT, t representing a time of day, k representing a specific time interval expressed as an integer, T representing a data sampling period of time; N representing a quantity of a plurality of the load-control switches associated with the plurality of electrical loads; N(x) representing a total number of load-control switches providing data messages within a predetermined time interval; $P_{res_i}$(t+kT) representing an electrical demand reserve at the time t+kT as reported by an ith reporting load-control switch; and q representing a final time interval in the predetermined time interval.

In another such embodiment, the method may further comprise receiving additional data messages transmitted from additional load-control switches controlling additional electrical loads supplied by the electrical utility, the additional data messages including additional predicted electrical demand reserves of the additional electrical loads as determined by respective processors of the additional load-control switches, the additional data messages combined with the first data message and the second data message defining total data messages received by a total number of reporting load-control switches, the total data messages received being received within a predetermined time interval; wherein determining an aggregate electrical demand reserve for a plurality of electrical loads is determined by the equation:

$$P_{AggRes}(t+kT) = \frac{P_{TOT}}{\sum_{i=0}^{n(X)} P_{max_i}} \sum_{i=1}^{n(X)} P_{res_i}(t+kT)$$

$k \in [0, q];$ $P_{AggRes}$(t+kT) representing the aggregate electrical demand reserve at a future time t+kT, t representing a time of day, k representing a specific time interval expressed as an integer, T representing a data sampling period of time; $P_{TOT}=\Sigma_{i=0}^{N}P_{max_i}$, $P_{maxi}$ representing a maximum power of an ith reporting load-control switch; N representing a quantity of a plurality of the load-control switches associated with the plurality of electrical loads; N(x) representing a total number of load-control switches providing data messages within a predetermined time interval; Presi (t+kT) representing an electrical demand reserve at the time t+kT as reported by an ith reporting load-control switch; and q representing a final time interval in the predetermined time interval.

In another such embodiment, the method may further comprise receiving additional data messages transmitted from additional load-control switches controlling additional electrical loads supplied by the electrical utility, the additional data messages including additional predicted electrical demand reserves of the additional electrical loads as determined by respective processors of the additional load-control switches, the additional data messages combined with the first data message and the second data message defining total data messages received by a total number of reporting load-control switches, the total data messages received being received within a predetermined time interval; wherein determining an aggregate electrical demand reserve for a plurality of electrical loads is determined by the equation:

$$P_{AggRes}(t+kT) = \frac{P_{TOT}}{n(X)} \sum_{i=1}^{n(X)} \frac{1}{P_{max_i}} P_{res_i}(t+kT)$$

$k \in [0, q];$ $P_{AggRes}$(t+kT) representing the aggregate electrical demand reserve at a future time t+kT, t representing a time of day, k representing a specific time interval expressed as an integer, T representing a data sampling period of time; $P_{TOT}=\Sigma_{i=0}^{N}P_{max_i}$, $P_{maxi}$ representing a maximum power of an ith reporting load-control switch; N representing a quantity of a plurality of the load-control switches associated with the plurality of electrical loads; N(x) representing a total number of load-control switches providing data messages within a predetermined time interval; $P_{resi}$ (t+kT) representing an electrical demand reserve at the time t+kT as reported by an ith reporting load-control switch switch; and q representing a final time interval in the predetermined time interval.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method of determining available electrical demand reserve at a facility remotely located from an electrical utility and having a communicative load-control switch (LCS) controlling an electrical load, the method comprising:
    sampling an electrical signal associated with the electrical load;
    determining a power usage of the electrical load based on the sampled data associated with the electrical load;
    storing in a memory device at the facility the power usage of the electrical load;
    determining at the facility a characteristic load profile of the electrical load based on the power usage of the electrical load, wherein determining a characteristic load profile includes calculating an average power usage for the electrical load over a predetermined number of days for the electrical load, for a predetermined time period T, the predetermined time period T starting at substantially the same time on each of the days comprises calculating an average power usage according to the equation:

$$P_c(t) = \frac{\sum_{n=1}^{m} P(t - 1440*n)}{m}$$

wherein Pc(t) is the characteristic power, m is the predetermined number of days, and t is a $t^{th}$ minute of a day n, and where t ranges from 0 to 1439; and
    determining at the facility an electrical demand reserve of the electrical load based on the determined characteristic load profile of the electrical load, wherein the electrical demand reserve is determined according to the equation: $P_{res}$ (t +kT)=$P_c$(t +kT)*S( t), where t is a time of day, k is an integer, T is a sampling period, Pc(t+kT) is a characteristic power usage at a future time t+kT, and S(t) is a scaling factor.

2. The method of claim 1, wherein sampling an electrical signal associated with the electrical load includes sampling an electrical signal over a predetermined sampling period T having a predetermined duration and starting at a predetermined time of day t and ending at a time t+T.

3. The method of claim 2, wherein the predetermined duration ranges from 15 minutes to 60 minutes.

4. The method of claim 1, wherein sampling an electrical signal associated with the electrical load includes checking multiple times for the presence or absence of a 24V control signal transmitted to the LCS over a predetermined sampling period.

5. The method of claim 1, wherein sampling an electrical signal associated with the electrical load includes one of: measuring an electrical current drawn by the electrical load during a predetermined sampling period and detecting the absence or presence of an electrical current drawn by the electrical load during a predetermined sampling period.

6. The method of claim 1, wherein determining a power usage of the electrical load based on the sampled data associated with the electrical load includes calculating a duty cycle of the electrical load.

7. The method of claim 6, further includes multiplying the duty cycle of the electrical load by a maximum power rating.

8. The method of claim 1, wherein determining a power usage of the electrical load based on the sampled data associated with the electrical load includes measuring an electrical current of the electrical load multiple times over a sampling time period and determining an average electrical current or power over the sampling time period.

9. The method of claim 1, wherein storing in a memory device at the facility the power usage of the electrical load comprises storing in a memory device of the LCS the power usage of the electrical load.

10. The method of claim 1, wherein determining at the facility an electrical demand reserve of the electrical load based on the determined characteristic load profile of the electrical load comprises determining an electrical demand reserve for a current time.

11. The method of claim 1, wherein determining at the facility an electrical demand reserve of the electrical load based on the determined characteristic load profile of the electrical load comprises determining an electrical demand reserve for a future time.

12. The method of claim 1, wherein determining at the facility an electrical demand reserve of the electrical load based on the determined characteristic load profile of the electrical load comprises setting the electrical demand reserve to be substantially equal to the characteristic power of the electrical load.

13. The method of claim 1, wherein the scaling factor is a function of past power usage and characteristic power usage.

14. The method of claim 1, wherein determining at the facility an electrical demand reserve of the electrical load based on the determined characteristic load profile of the electrical load comprises predicting an electrical demand reserve for a future time.

15. The method of claim 1, further comprising transmitting a data message from the LCS to a master station of an electrical utility, the data message including data corresponding to demand reserve for a current time or a future time such that the electrical utility can aggregate the data corresponding to demand reserve from a multiplicity of facilities each having an LCS to predict an overall future load on the electrical utility and, in response, selectively command individual LCS to shed electrical load.

16. A communicative load-control switch for controlling an electrical load at a facility remotely located from an electrical utility and determining an available electrical demand reserve of the electrical load, comprising:

means for sampling an electrical signal associated with the electrical load;

means for determining a power usage of the electrical load based on the sampled data associated with the electrical load;

means for storing in a memory device at the facility the power usage of the electrical load;

means for determining a characteristic load profile of the electrical load based on the power usage of the electrical load, wherein the means for determining the characteristic load profile is at the facility, and wherein determining a characteristic load profiles includes calculating an average power usage for the electrical load over a predetermined number of days for the electrical load, for a predetermined time period T, the predetermined time period T starting at substantially the same time on each of the days comprises calculating an average power usage according to the equation:

$$P_c(t) = \frac{\sum_{n=1}^{m} P(t - 1440*n)}{m},$$

where Pc(t) is the characteristic power, m is the predetermined number of days, and t is a $t^{th}$ minute of a day n, and where t ranges from 0 to 1439; and means for determining at the facility an electrical demand reserve of the electrical load based on the determined characteristic load profile of the electrical load, wherein the electrical demand reserve is determined according to the equation: $P_{res}(t+kT)=P_c(t+kT)*S(t)$, where t is a time of day, k is an integer, T is a sampling period, Pc(t+kT) is a characteristic power usage at a future time t+kT, and S(t) is a scaling factor.

17. A communicative load-control switch for controlling an electrical load at a facility remotely located from an electrical utility and determining an available electrical demand reserve of the electrical load, comprising:

a switching device configured to receive a control signal from a control device and to selectively transmit the control signal to a control circuit of an electrical load;

a transceiver configured to receive a communication signal, the communication signal including load-control commands for selectively controlling the switching device, and to transmit predicted load information;

a processor located at the facility, wherein the processor is in communication with the switching device and the transceiver, and wherein the processor is configured to determine predicted load information of the electrical load, and wherein the processor is configured to determine a characteristic load profile of the electrical load by calculating an average power usage for the electrical load over a predetermined number of days for the electrical load, for a predetermined time period T, the predetermined time period T starting at substantially the same time on each of the days comprises calculating an average power usage according to the equation:

$$P_c(t) = \frac{\sum_{n=1}^{m} P(t - 1440*n)}{m},$$

where Pc(t) is the characteristic power, m is the predetermined number of days, and t is a $t^{th}$ minute of a day n, and where t ranges from 0 to 1439; and wherein the transceiver is further configured to transmit a data message that includes the predicted load information of the electrical load for aggregation at a remote site.

18. The load-control switch of claim 17, wherein the predicted load information includes a predicted current demand reserve.

19. The load-control switch of claim 18, wherein the predicted load information includes a predicted future demand reserve.

20. The load-control switch of claim 19, wherein the future demand reserve of the electrical load is determined based on a characteristic load profile.

21. The load-control switch of claim 20, wherein the future demand reserve is determined by multiplying the characteristic load profile by a scaling factor.

22. The load-control switch of claim 21, further comprising a memory device in communication with the processor, the memory device storing the predicted load information.

23. The load-control switch of claim 17, wherein the predicted load information is selected from the group consisting of a predicted demand reserve, a maximum load, a determined load, and a characteristic load.

24. The load-control switch of claim 23, further comprising a sensing device configured to sense an electrical signal associated with the electrical load, the sensing device in communication with the processor, and wherein the processor is further configured to determine the load information based on the electrical signal associated with the electrical load.

25. The load-control switch of claim 24, wherein the electrical signal associated with the electrical load is the control signal of the switching device as transmitted by the switching device.

26. A method of determining an aggregate electrical demand reserve of a plurality of distributed electrical loads, each electrical load being controlled by a load-control switch, comprising:

receiving a first data message transmitted from a first load-control switch controlling a first electrical load supplied by an electrical utility, the first data message including a predicted electrical demand reserve of the first electrical load as determined by a processor of the first load-control switch;

receiving a second data message transmitted from a second load-control switch controlling a second electrical load supplied by the electrical utility, the second data message including a predicted electrical demand reserve of the second electrical load as determined by a processor of the second load-control switch;

determining at the facility an aggregate electrical demand reserve for a plurality of electrical loads supplied by the electrical utility, the plurality of electrical loads including the first electrical load and the second electrical load, each of the plurality of electrical loads having an associated load-control switch, the determination being based on the received predicted electrical demand reserve of the first electrical load and the predicted electrical demand reserve of the second electrical load; and receiving additional data messages transmitted from additional load-control switches controlling additional electrical loads supplied by the electrical utility, the additional data messages including additional predicted electrical demand reserves of the additional electrical loads as determined by respective processors of the additional load-control switches, the additional data messages combined with the first data message and the second data message defining total data messages received by a total number of reporting load-control switches, the total data messages received being received within a predetermined time interval.

27. The method of claim 26, wherein the predicted electrical demand reserve of each of the first electrical load and the second electrical load includes a future demand reserve.

28. The method of claim 26, wherein the predicted electrical demand reserve comprises a characteristic power usage of the first electrical load.

29. The method of claim 28, wherein the characteristic power usage is determined by the processor of the first load-control switch, the characteristic power usage being determined based on multiple sample measurements of a characteristic of the power usage of the first electrical load taken over a predetermined period of time.

30. The method of claim 29, wherein the characteristic power usage is further determined based on a duty cycle of the first electrical load.

31. The method of claim 26, wherein the predicted electrical demand reserve of the first and the first electrical load includes a predicted electrical demand reserve for the first electrical load for a first time $t_1$ and a second time $t_2$, the second time $t_2$ being later than the first time $t_1$.

32. The method of claim 26, wherein the first data message is received at a first time that is different than a second time that the second data message is received.

33. The method of claim 32, wherein the first time and the second time are random times.

34. The method of claim 26, wherein receiving a first data message and receiving a second data message comprise receiving the first data message and the second data message within a predetermined time interval.

35. The method of claim 26, wherein determining an aggregate electrical demand reserve for a plurality of electrical loads supplied by the electrical utility comprises summing the predicted demand reserves of the total data messages received within the predetermined time interval, dividing the sum by a number of load-control switches providing the total data messages received, thereby determining an average predicted demand reserve per load-control switch reporting during the predetermined time interval, and multiplying the average predicted demand reserve per load-control switch reporting during the predetermined time interval by a number of the plurality of load-control switches.

36. The method of claim 26, wherein determining an aggregate electrical demand reserve for a plurality of electrical loads is determined by the equation:

$$P_{AggRes}(t+kT) = \frac{N}{n(X)} \sum_{i=1}^{n(X)} P_{res_i}(t+kT)$$

$$k \in [0, q),$$

$P_{AggRes}(t+kT)$ representing the aggregate electrical demand reserve at a future time t+kT, t representing a time of day, k representing a specific time interval expressed as an integer, T representing a data sampling period of time; N representing a quantity of a plurality of the load-control switches associated with the plurality of electrical loads; N(x) representing a total number of load-control switches providing data messages within a predetermined time interval; Presi (t+kT) representing an electrical demand reserve at the time t+kT as reported by an ith reporting load-control switch; and q representing a final time interval in the predetermined time interval.

37. The method of claim 26,
wherein determining an aggregate electrical demand reserve for a plurality of electrical loads is determined by the equation:

$$P_{AggRes}(t+kT) = \frac{P_{TOT}}{\sum_{i=0}^{n(X)} P_{max_i}} \sum_{i=1}^{n(X)} P_{res_i}(t+kT)$$

$$k \in [0, q);$$

$P_{AggRes}$(t+kT) representing the aggregate electrical demand reserve at a future time t+kT, t representing a time of day, k representing a specific time interval expressed as an integer, T representing a data sampling period of time; $P_{TOT} = \Sigma_{i=0}^{N} P_{max_i}$, $P_{maxi}$ representing a maximum power of an ith reporting load-control switch; N representing a quantity of a plurality of the load-control switches associated with the plurality of electrical loads; N(x) representing a total number of load-control switches providing data messages within a predetermined time interval; Presi (t+kT) representing an electrical demand reserve at the time t+kT as reported by an ith reporting load-control switch; and q representing a final time interval in the predetermined time interval.

38. The method of claim 26,
wherein determining an aggregate electrical demand reserve for a plurality of electrical loads is determined by the equation:

$$P_{AggRes}(t+kT) = \frac{P_{TOT}}{n(X)} \sum_{i=1}^{n(X)} \frac{1}{P_{max_i}} P_{res_i}(t+kT)$$

$$k \in [0, q);$$

$P_{AggRes}$(t+kT) representing the aggregate electrical demand reserve at a future time t+kT, t representing a time of day, k representing a specific time interval expressed as an integer, T representing a data sampling period of time; $P_{TOT} = \Sigma_{i=0}^{N} P_{max_i}$, $P_{maxi}$ representing a maximum power of an ith reporting load-control switch; N representing a quantity of a plurality of the load-control switches associated with the plurality of electrical loads; N(x) representing a total number of load-control switches providing data messages within a predetermined time interval; $P_{res_i}$ (t+kT) representing an electrical demand reserve at the time t+kT as reported by an ith reporting load-control switch; and q representing a final time interval in the predetermined time interval.

* * * * *